United States Patent [19]
Keller

[11] 3,944,062

[45] Mar. 16, 1976

[54] APPARATUS FOR SORTING AND CONVEYING OF OBJECTS

[76] Inventor: Alexander Keller, Pestalozzistr. 7, 404 Neuss (Rhine), Germany

[22] Filed: Oct. 30, 1974

[21] Appl. No.: 519,103

[30] Foreign Application Priority Data
Oct. 30, 1973  Germany............................ 2354245
Mar. 22, 1974  Germany............................ 2413906

[52] U.S. Cl. ............ 198/220 BA; 198/269; 198/280
[51] Int. Cl.² ........................................ B65G 27/00
[58] Field of Search ... 198/220 A, 220 BA, 220 BC, 198/268, 269, 280; 221/158, 171, 172

[56] References Cited
UNITED STATES PATENTS

| | | | |
|---|---|---|---|
| 1,945,888 | 2/1934 | Fields................................. | 198/268 |
| 2,841,269 | 7/1958 | Jenney et al...................... | 198/268 |
| 3,095,957 | 7/1963 | Roberts et al. ................. | 198/268 X |
| 3,261,442 | 7/1966 | Beck............................... | 221/158 X |
| 3,365,047 | 1/1968 | Schmitz ............................. | 198/268 |
| 3,414,111 | 12/1968 | Ernest............................... | 221/172 X |

*Primary Examiner*—Allen N. Knowles
*Attorney, Agent, or Firm*—Michael J. Striker

[57] ABSTRACT

The apparatus has a downwardly inclined guide ramp which diverges in its width in downward direction and is provided on its upper surface with parallel guide channels. An upper end of the ramp receives a stream of identical objects which are located in random orientation and in overlapping relationship in the stream. The lower end of each guide channel discharges into a pair of sorting channels and a routing arrangement is provided upstream of these sorting channels to assure that objects having a desired orientation enter only one of the sorting channels whereas objects having an undesired orientation enter only the other sorting channel where they encounter a reversing arrangement which reverses their position until they, also, assume the desired orientation.

14 Claims, 9 Drawing Figures

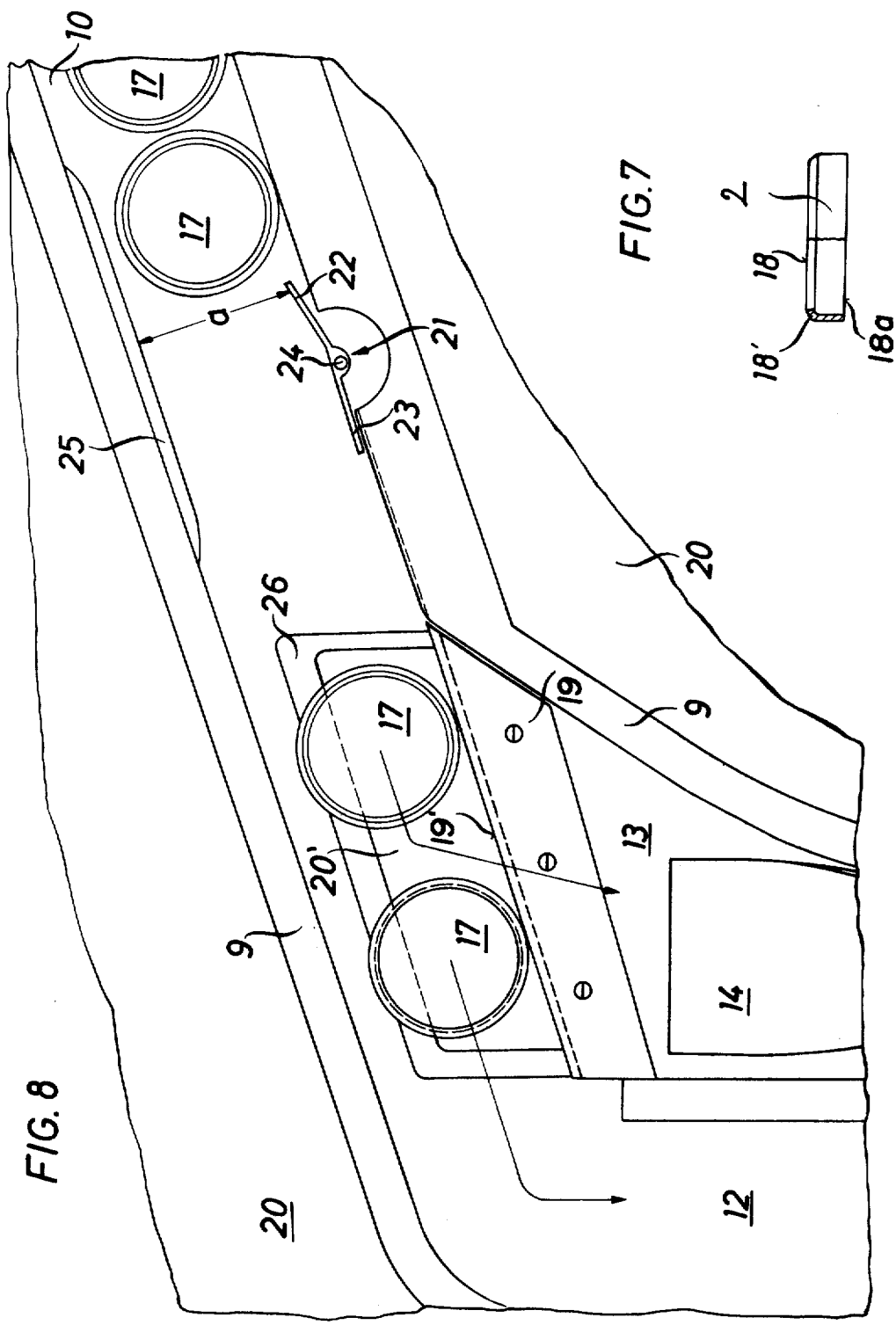

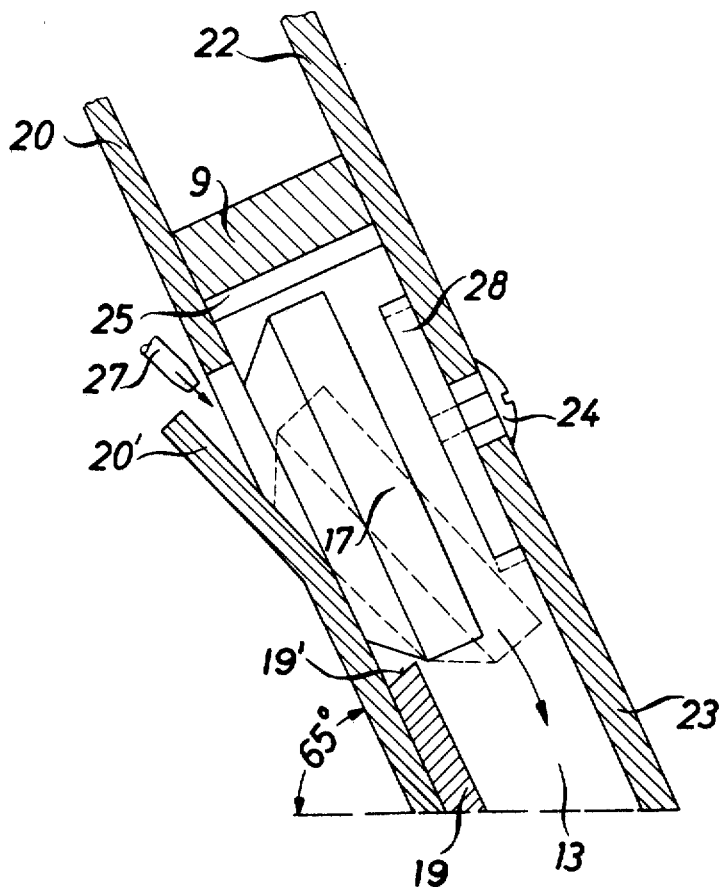

APPARATUS FOR SORTING AND CONVEYING OF OBJECTS

BACKGROUND OF THE INVENTION

This application is directed to an apparatus for distributing, sorting and conveying of a stream of similar objects which are positioned in random orientation and overlapping relationship.

In particular, the invention relates to such an apparatus for handling of objects having two major sides, one of which is flat and the other of which is bounded by a rounded or bevelled margin.

It is known to provide vibratory conveyors, especially vibratory drums, for conveying of pourable material and mass articles, especially those which are of small weight. To obtain a high conveying capacity per unit time these devices are so constructed that the material which they convey issues from the device in form of a stream wherein the articles or objects overlap one another and have random orientation. This is especially true of certain industries where very high conveying speeds are required, for example in the beverage bottling industry such devices are used, inter alia, for conveying bottle caps or the like. Such bottle caps or similar articles may be of round shape and have differently configurated upper and lower sides; it is desirable that these objects be supplied to a storage receptacle—for later furnishing to a user—in a certain predetermined orientation, for example always with the upper side facing up. In the case of bottle caps it may be necessary to so supply these caps for use in capping machines which are capable of capping as many as 50 thousand bottles per hour.

It is evident that under such circumstances, it is not practicable to remove from the supply stream such bottle caps or other objects which do not have the required orientation, as this would significantly reduce the feed rate of the vibratory conveyor which would then not be able to keep up with the hourly demand of the capping machine.

SUMMARY OF THE INVENTION

The present invention seeks to overcome these problems.

In particular, it is an object of the present invention to provide an apparatus which is capable of forming the stream of objects issuing from a vibratory conveyor, into a single layer of objects, and of imparting to all such objects which do not yet have the desired orientation, a movement will will cause them to assume such orientation.

In keeping with these and other objects, the invention provides an apparatus for conveying and sorting or similar objects having opposite sides, one of which is flat and which are connected by a side wall having a bevel adjacent the other side. The apparatus comprises means for supplying a stream of said objects in random orientation and in overlapping relationship. This means may be a vibratory conveyor, especially a vibratory drum. Ramp means has one end on which it receives this stream and conically diverges from this one towards another end. The ramp means is progressively downwardly inclined relative to the horizontal, from the one end to the other end. It carries guide rails which form parallel guide channels each having a height slightly greater than the distance between the aforementioned sides of the objects.

Sorting channels are associated in pairs with the outlet end of each guide channel. Routing means routes objects having the desired orientation into one sorting channel of the pair, and routes all other objects into the other sorting channel of the pair. Reversing means is associated with the other channel of each pair and so reverses the position of the respective objects that when they issue from the other sorting channel they, also, have the desired orientation.

If the supply means is a vibratory drum, then I have found it to be of advantage if the guide ramp overlies an outlet portion—e.g., of sickle shape—of the drum, so that the exiting stream of objects will spread out to a width which is a multiple of its width at the outlet of the drum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying claims.

BRIEF DESCRIPTION OF THE DRAWING

FIG. 7 is a partial axial section through one of the objects to be conveyed.

FIG. 8 is an enlarged view showing a detail of FIG. 1; and

FIG. 9 is a fragmentary section through FIG. 8.

DESCRIPTION OF THE PREFERRED EMBODIMENTS

Figure 1:
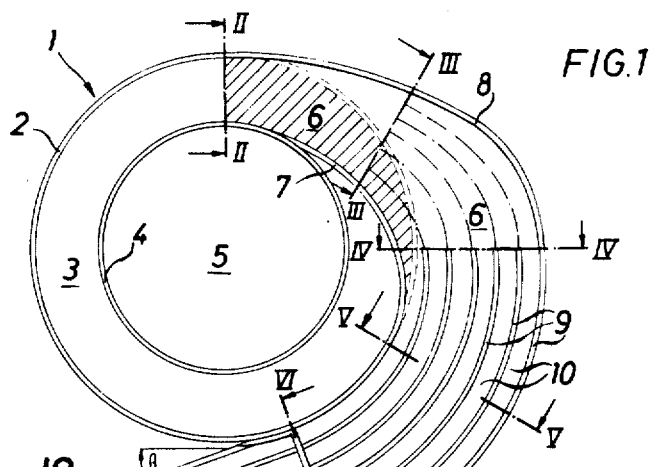
FIG. 1 is a diagrammatic top plan view of the apparatus of the present invention.
Figure 2:
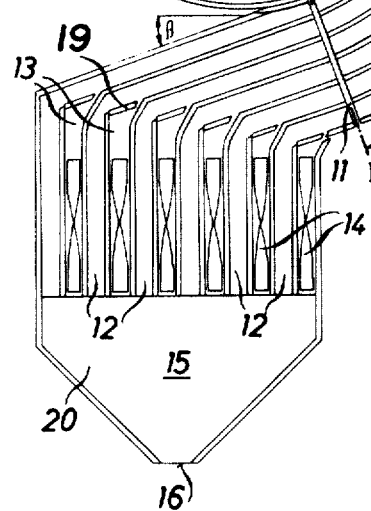
FIG. 2 is a section taken on line II—II of FIG. 1.
Figure 2:
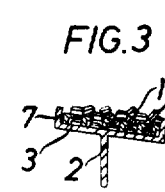
Figure 3:
FIG. 3 is a section on line III—III of FIG. 1.
Figure 4:
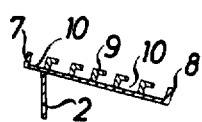
FIG. 4 is a section on line IV—IV of FIG. 1.
Figure 5:
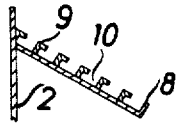
FIG. 5 is a section on line V—V of FIG. 1.
Figure 6:
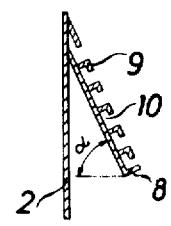
FIG. 6 is a section on line VI—VI of FIG. 1.

FIG. 1 shows a conventional vibratory drum of the type which is in wide commercial use. It has an outer wall 2 and a conveying channel 3 which may on the inside be delimited by an upstanding wall portion 4. The objects 17 to be conveyed (see FIG. 7) are admitted into the free center 5 of the drum 1, for example by being blown in via a (not illustrated) compressed air device and drop onto the bottom of the drum 1 from where they are conveyed in upward direction in a multilayer stream. This upward movement continues until the level of the section line II—II in FIG. 1 is reached, where the stream of objects is discharged onto a guide ramp 6. A comparison of FIGS. 3 and 4 with FIG. 1 indicates that the guide ramp increases continuously in direction away from the drum 1 and also extends in direction downwardly of the horizontal to a progressively greater extent (see FIGS. 3–6 from which it should be understood that the greatest angle of inclination α amounts to about 25°). In the region of the drum, the edges of the ramp 6 are bounded by side walls 7 and 8; the former is a continuation of the wall portion 4 and merges in the area of the section lines V—V with the wall 2 of the drum. The side wall 8 constitutes an extension of the drum wall 2. This construction assures that the ramp 6 overlaps that portion of the drum 1 which is shaded in FIG. 1 and which has a substantially sickle-shaped configuration.

The initially constant increase in the width of the ramp 6 assures that the stream of objects exiting from the drum 1 can spread out substantially and form a layer having the depth of a single object; i.e., a layer wherein the objects 17 no longer overlap one another as was the case in the stream. This spreading out is completed by the time the articles reach the region of the section line IV—IV. From this region onwards, the ramp 6 is provided with a plurality of parallel curved guide rails 9 which project progressively from the surface of the ramp 6, as indicated by the broken-line showing in FIG. 1, until they reach their full height in the region of the section line IV—IV. Upstream of this region they do not interfere with the spreading out of the articles because of their very gradual increase in height. These guide rails 9 form guide channels 10 into which the objects 17 enter individually under the influence of gravity and the impetus imparted by the vibration of the drum 1.

The channels 10 are curved until they reach the region of the section line VI—VI; from there on they continue on a planar plate 20 at an angle β so selected that the objects will roll on the plate 20 (in their channels 10) at different speeds. The plate 20 is separated from the ramp 6 by a narrow gap 11 so that the movement of the objects 17, while they are on the plate 20, is no longer influenced by vibrations of the drum 1 and results exclusively from gravity; it is mounted independently of the drum 1 and inclined to the horizontal at the angle α of 25°. The plate portion forms the rear wall of steep pairs of sorting channels 12, 13 which communicate pairwise with the channels 10, and also of a container 15 having an outlet opening 16 from which the objects 17 issue individually to move to a user.

FIGS. 8 and 9 show in about twice actual scale further details of the channels 10 for the objects 17 which have the shape shown in FIG. 7. These objects have planar or flat sides 18 and 18a and are circular. The margin of the side 18 is bevelled (or else rounded, which is intended to be included in the definition of the term "bevelled" as used herein) at 18'. The objects are to be admitted into the container 15 in a single layer and in such a manner that the sides 18a are in contact with the plate 20.

The objects 17 which enter the channels 10 in the wrong orientation, i.e., with their sides 18 facing the ramp 6 so they would eventually also face the plate 20, must be sorted out of the stream of objects and their orientation be corrected so that they assume the proper and desired orientation.

For this purpose, the channel 13 incorporates a reversing spiral 14 which reverses an entering object 17 through 180°. Upstream of the spiral 14, the channel 13 is provided with a member 19 that is mounted on the plate 20 and which has a thickness slightly smaller than the height of the bevel 18' of the objects 17. When an object having the wrong orientation engages the upper edge 19' of the member 19, it slides laterally into the channel 13 and, on encountering the spiral guide 14, is turned through 180° before it enters the container 15 in now proper orientation. The upper edge 19' of the member 19 is bevelled so as to include with the surface of the plate 20 an acute angle; this assures a reliable sliding-off of objects 17 having the wrong orientation. A further measure for the same purpose is the provision of a triangular recess or cutout 26 formed in the plate 20 in the region of each member 19, having a height which is smaller than the diameter of the objects 17.

The punched-out wall portion 20' is bent rearwardly at its base and the respective improperly oriented object 17 will thus be guided into the broken-line inclined position (see FIG. 9) in which its sliding off is assured. Properly oriented objects 17, on the other hand, slide over the edge 19', being guided above the recess 26 by the surface of plate 20, and drop into the channel 12 and from there directly into the container 15.

Above the wall portion 20' there may be arranged a nozzle 27 which ejects air or another gas and serves to hasten the sliding off of improperly oriented objects 17. At the outer side of the channel 13 there may be arranged an adjusting plate 28 which makes it possible to reposition the upper edge 19', for example by shifting the plate 28 into the broken-line position, to compensate for tolerance variations and/or assembling inaccuracies.

It is necessary to assure that the objects 17 moving in the channels 10 travel at identical speeds when they arrive at the members 19 and the channels 12, 13, to obtain a uniform rate of feed into the container 15. For this purpose, each of the channels 10 has arranged in it—always at identical spacing from the channels 12, 13—a rocker member 21 which is provided with two mutually oppositely projecting arms 22 and 23. The total length of these arms corresponds about to the diameter of the objects 17 and which include with one another an obtuse angle of about 150°–170°. Each rocker member is mounted for pivoting about an axis 24 which extends normal to the plane of plate 20. The arms 22 and 23 balance one another, i.e., they are in equilibrium as are the arms of a balance-type scale. The distance a of the upper edge of the arm 22 from the neighboring (i.e., upper in FIG. 8) rail 9 is slightly smaller than the diameter of the objects 17 when the member 21 is in the illustrated position. This can be achieved by provision of a special guide portion 25.

When a moving object 17 engages the arm 22, the latter is depressed by the weight of the object. This reduces the speed of movement of the object until it has depressed the arm 23; during this time, the next-following object 17 is restrained against advancement by the arm 22. In the remaining path portion to be travelled, i.e., from member 21 to the channels 12, 13, the speed of movement of all objects will then be identical.

The provision of the steep channels 12, 13 also assures that a backing up of the quantities of the objects 17 at the inlets of the channels 12, 13 is impossible.

It will be understood that each of the elements described above, or two or more together, may also find a useful application in other types of applications differing from the type described above.

While the invention has been illustrated and described as embodied in a device for sorting and conveying similar objects, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for sorting and conveying of similar objects having opposite sides, one of which is flat and which are connected by a side wall having a bevel adjacent the other side, comprising means for supplying a stream of said objects in random orientation and in overlapping relationship; guide ramp means having one end for receiving said stream and conically diverging in width towards another end, said guide ramp means being progressively downwardly inclined from the horizontal in direction towards said other end; guide rail means on said guide ramp means and forming thereon a plurality of longitudinally extending parallel guide channels each having a height slightly greater than the distance between said sides of said objects; sorting channel means in the region of said other end and comprising a plurality of pairs of sorting channels communicating with the respective guide channels, each pair of sorting channels including a first sorting channel for receiving from the associated guide channel such objects as have a desired orientation and a second sorting channel for receiving such objects as have an undesired orientation; routing means upstream of said pairs of sorting channels and operative for routing the objects into said first or second sorting channel of the respective pair in dependence upon the orientation of the respective object; and reversing means associated with said second sorting channel of each pair for reversing the position of the objects therein so that they assume said desired orientation.

2. Apparatus as defined in claim 1, wherein said sorting channels have an upright orientation.

3. Apparatus as defined in claim 1, wherein said reversing means comprises a reversing guide for reversing said objects through 180°.

4. Apparatus as defined in claim 1, wherein said supplying means comprises a vibratory drum.

5. Apparatus as defined in claim 4, wherein said vibratory drum has sickle-shaped portion, and wherein said guide ramp means overlaps said sickle-shaped portion.

6. Apparatus as defined in claim 1, wherein said guide ramp means includes a first portion adjacent said supplying means and a second planar plate portion downwardly inclined relative to the horizontal and separated from said first portion by a narrow gap, said guide rail means being provided on said plate portion.

7. Apparatus as defined in claim 6, wherein said plate portion also constitutes a wall of a container for receiving said objects, said sorting channels also being provided on said plate portion and communicating with said container.

8. Apparatus as defined in claim 7, wherein each of said guide rails has a longitudinal discontinuity; and further comprising a rocker member mounted in each discontinuity for rocking movement about a horizontal axis extending transversely of said guide rails, said rocker member having one arm facing in the direction of advancement of said objects and another arm which extends at an obtuse angle relative to said one arm and faces opposite said direction.

9. Apparatus as defined in claim 8, wherein said arms are balanced relative to one another so that said rocker member normally assumes a position of equilibrium.

10. Apparatus as defined in claim 8, wherein said other arm is movable to and from a position in which it is spaced from the respectively neighboring guide rail by a distance which is smaller than the diameter of said objects.

11. Apparatus as defined in claim 8, wherein each of said arms has a length which substantially equals a radius of said objects.

12. Apparatus as defined in claim 1, wherein said routing means comprises members each having an edge which is flush with a respective guide rail, and wherein said second sorting channel of each pair is offset by a distance corresponding substantially to the thickness of the respective member.

13. Apparatus as defined in claim 12, wherein said edge is bevelled in direction toward said guide ramp means.

14. Apparatus as defined in claim 12, wherein said guide ramp means is formed upstream of the respective members with areas where the material of said guide ramp means is bent out of the plane of said guide ramp means and out of the respective guide channel at such an angle that the plane of the bent-out material intersects said edge of the respectively associated member.

* * * * *